Sept. 11, 1956 H. N. BURKHART 2,762,326
METHOD FOR FORMING T-FITTING
Filed Dec. 28, 1954

INVENTOR.
HAROLD N. BURKHART
BY
Charles L. Lovercheck
attorney

United States Patent Office 2,762,326
Patented Sept. 11, 1956

2,762,326
METHOD FOR FORMING T-FITTING

Harold N. Burkhart, Erie, Pa., assignor to Keystone Brass Works, Inc., a corporation of Pennsylvania Application December 28, 1954, Serial No. 478,135

1 Claim. (Cl. 113—44)

This invention relates to metal fittings and more particularly to a method of making metal fittings.

This application is a continuation in part of application, Serial No. 244,765, filed September 1, 1951, now abandoned.

The prior application relates to the forming of metal fittings and couplings such as T's, Y's crosses, and other types of lateral branch fittings by cold working the blank material to the final shape of the desired fitting. Preferably, copper is employed as the material which is formed into the fitting.

In the manufacture of pipe fittings and couplings, considerable work has been done in attempting to devise a means for manufacturing high grade fittings having the desired strength, physical characteristics, and yet fittings which can be manufactured at a cost which will not be prohibitive. In forming T-shaped fittings from sections of tubing, all prior methods produced fittings having walls of non-uniform thickness because an even flow and distribution of the blank metal into the walls of the branches of the fitting were not accomplished. The branch wall of the fitting was formed by supporting the entire outside of a tube except the area where the branch was to be located by forcing the tube material into the branch. This resulted in a stretching of the material at that point and did not maintain the desired uniform wall thickness of the branch. This was due to several reasons, among them the fact that filler material which was used to force the material of the tube into the branch of the die was often a liquid or some similar material. There was very little tendency for filler material to urge the tube material from the side of the tube opposite the branch toward the branch to maintain its wall thickness.

In processes utilizing a force on the end of the tube in addition to a compressive force on the filler material, the tube material had a tendency to thicken or crumple at the side of the tube opposite the T-branch and material would not flow from the body of the tube to the T-branch. Where a mandrel has been used in prior designs to compensate for the diminution of volume of filler material, the mandrel used has been too small to direct the flow and has not been disposed in the blank in such manner that the filler material will flow around the blank and in a direction to direct the blank material to the areas thereof where it will form the final shape of the desired fitting.

It is, therefore, an object of this invention to provide a means for forming a fitting wherein the means is simple, efficient, and results in a high grade fitting.

Another object of the invention is to provide a process for forming a metal fitting with a branch thereon wherein the material from all parts of the tube is forced to flow toward the branch urging the blank material to flow in the desired direction.

A further object of the invention is to provide a means for forming tubular material into desired shapes wherein the filler material is work hardened to increase its physical characteristics to become more similar to the physical characteristics of the material being formed.

Another object of this invention is to provide a means for forming metal fittings wherein the amount of filler material is reduced over the amount used in any previous device.

Another object of the invention is to provide a novel means of forming a metal fitting wherein the guided flow of a filler metal urges the metal of a blank to flow toward the fitting branches to be formed.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
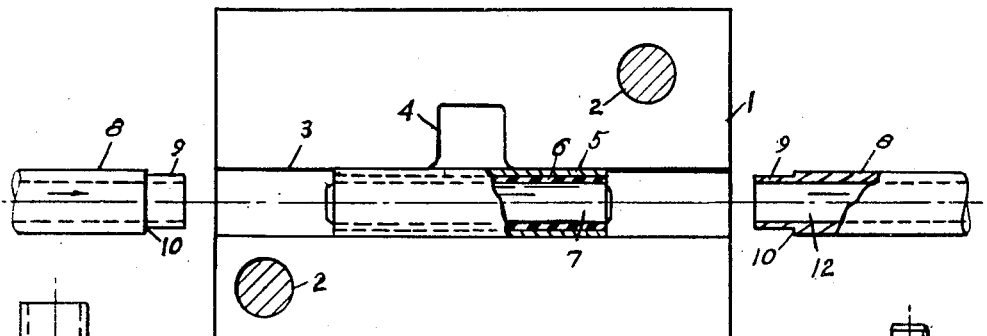
Fig. 1 is a side elevational view of a one-half section of the novel split die with a tubular blank therein and with a mandrel and tubular filler disposed in the blank, the tubular filler and mandrel being partly in section, and plungers in an exploded position adjacent the die.

For the purposes of illustration, the drawing shows a die to form a T-fitting; however, it will be evident that the novel method of forming a wrought metal fitting may be utilized for forming crosses or fittings which have branches extending laterally outwardly at any predetermined angle to the longitudinal axis of the fitting. Also, the ends of the fitting may be of a different diameter as in a reducing fitting.

Figures 2, 4, 5:
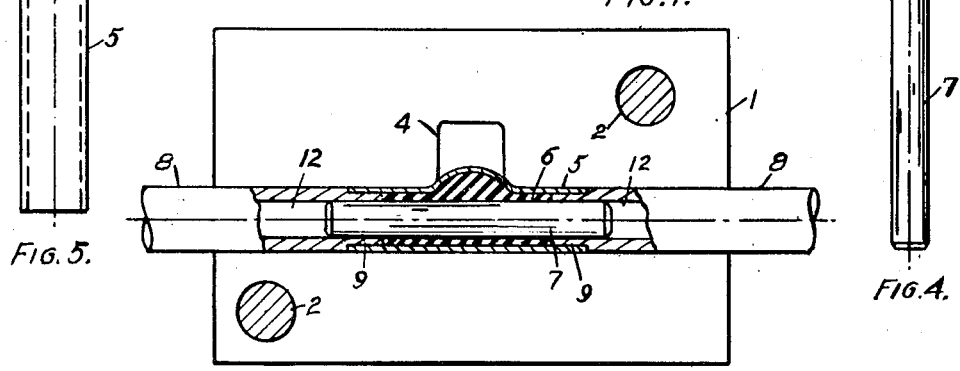
Fig. 2 is a side elevational view of the die as shown in Fig. 1 with the plungers in engagement with the filler and tubular blank after an initial movement of the plungers, the plungers being telescoped on the mandrel.
Fig. 4 is a side elevational view of the mandrel used in the novel method of forming a wrought metal branch fitting.
Fig. 5 is a side elevational view of the wrought metal blank used for making the wrought metal branch fitting in the novel method of making a wrought metal branch fitting.
Figure 3:
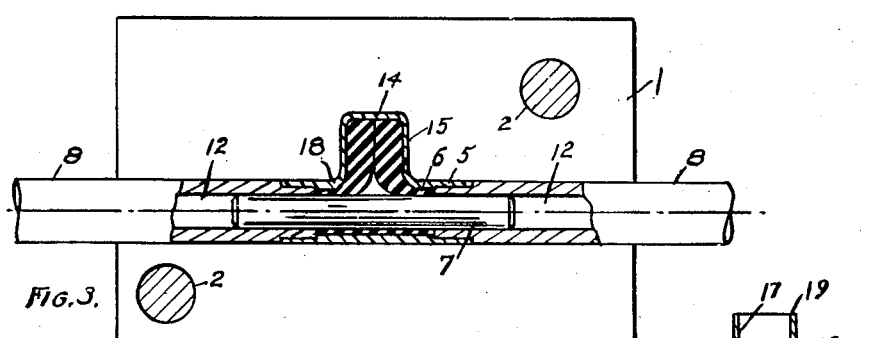
Fig. 3 is a side elevational view of the completely formed fitting in the die with the plungers moved to their final inward position.

Referring now to the drawing, Figs. 1, 2, and 3 show a mated section of a sectional die 1 comprising two similar mated sections connected together by conventional bolts 2 or any other conventional fastening means, the mated sections forming a longitudinally extending cylindrical bore 3 and a laterally extending cylindrical bore or closed end recess 4 intermediate the longitudinally extending bore 3. A tubular blank 5 of predetermined length, diameter, and wall thickness is selected in accordance with the wall thickness and dimensions of the fitting desired. The blank 5 is preferably a drawn or pressed wrought metal such as a wrought seamless drawn tube of copper or an alloy thereof; however, any suitable metal or alloy thereof may be used which has the proper tractable properties so that it flows in the die 1. The blank 5 has a tubular shaped filler 6 and a mandrel 7 inserted centrally therein as shown in Fig. 1. The filler 6 is made of any conventional deformable material such as lead or alloys thereof, for example, an alloy sold under the trade-name "Wood's metal," which is solid at room temperature and capable of being melted out of the fitting after the forming operation at a temperature which will not anneal or cause any deleterious or harmful effect to the metal forming the fitting. The filler 6 must be of a material having suitable internal resistance and yield point inasmuch as liquids have not proved practical for filler material.

Opposed plungers 8 with cylindrical bores 12 extend into opposite ends of the bore 3, each of the plungers 8 having a reduced end 9 forming a shoulder 10. The diameter and wall thickness of the reduced ends 9 of the plungers 8 are substatially the same as those of the filler 6 so that the reduced ends 9 of the plungers 8 move into telescopic relationship with the ends of the blank 5 as shown in Figs. 2 and 3 with the shoulders 10 thereof engaging the ends of the blank 5. The plungers 8 are operated by any conventional mechanical or hydraulic means. The plungers 8 travel a predetermined distance into the bore 3, the external diameter of the plungers 8 being substantially that of the bore 3, thereby tending to support the ends of the tubes.

Figures 6, 7, 8:
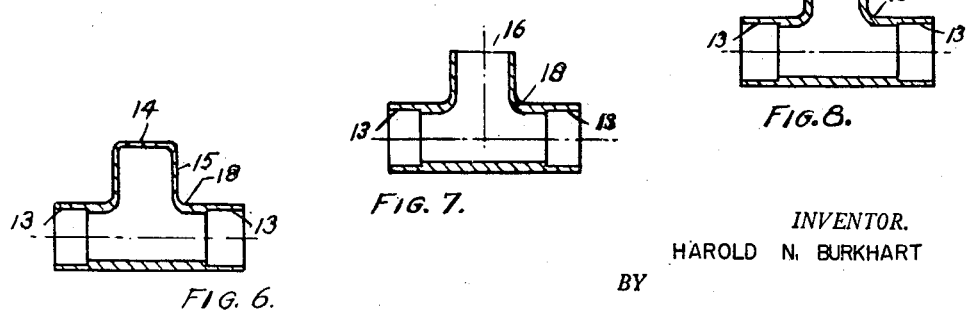
Fig. 6 is a vertical sectional view of the initially formed T-fitting shown in the die in Fig. 3.
Fig. 7 is a vertical sectional view of the initially formed fitting shown in Fig. 6 with the end of the extruded branch faced off.
Fig. 8 is a vertical sectional view of the fitting shown in Fig. 7 with the extruded branch end thereof counterbored.

The contour of the interior of the sectional die 1 is shaped so as to conform to the external contour of a desired fitting. When the plungers 8 move into the bore 3, pressure is applied by the reduced ends 9 on the plastic non-compressible filler material 6 and the shoulders 10 engage the opposite ends of the blank 5 at the same time to apply pressure thereto. As the plungers 8 move inwardly, the ductile metal of the blank 5 adjacent the recess 4 in the die 1 is extruded thereinto. Pressure of the plungers 8 on the filler material 6 causes it to flow around the mandrel 7 through the relatively narrow passage between the mandrel 7 and the walls of the blank 5, exerting a frictional force on the inside surface of the blank 5 in the direction of the branch to be formed. Therefore, the material of the blank 5 will be urged to flow toward the branch or, in effect, pushed along to form a branch section 15 as shown in Figs. 3 and 6. The body of the fitting initially formed takes the same form as the T defined by the longitudinally extending bore 3 and recess 4 normal thereto. The amount of filler material 6 is predetermined so the volume of the mandrel which moves back into the plungers is actually less than the diminution of volume of the blank. This results in a void in the filler material which usually appears near the center of the branch adjacent the mandrel as shown in Fig. 3. The optimum amount of filler material may be arrived at by experimentation by decreasing the amount of filler material until the fittings produced have the desired high quality of uniform wall thickness of both body and branch. At the optimum amount of filler material, the said void will result. The volume of the portion of the mandrel enclosed between the ends of the filler material before pressure is applied thereto referred to in the claim herein refers to that portion of the mandrel enclosed in filler material in Fig. 1. If the mandrel were longer and extended beyond the ends of the filler material, the volume of filler material referred to would not include the projecting ends of the mandrel. The ratio of mandrel to filler material has been expressed in volumes since I find it most convenient to express this ratio in terms of volume.

The plungers 8 have the axial bore 12 of substantially the same diameter as the mandrel 7 so that the mandrel 7 moves telescopically therein. The tubular blank 5 is preferably made of a ductile, pliant tractable material such as copper or any alloy thereof so that it will flow in the die 1 around the mandrel 7 between the mandrel 7 and the inside wall of the blank 5 and urge the material to flow toward the branch.

The initial fitting formed by the above described method and shown in Fig. 6 has counterbored sized ends 13 formed on the ends of the blank 5 in which the reduced ends 9 of the plungers 8 are in engagement. The counterbored ends 13 are of such a size and shape that a pipe or tube may be sweat soldered thereto in a conventional manner. The end 14 of the branch section 15 is faced off in any suitable conventional manner as shown at 16 in Fig. 7 and the branch section 15 is counterbored at 17 as shown in Fig. 8 to form a pipe connecting sized end 19 in order that a pipe or tube may be sweat soldered thereto. These are the only machining operations required after the initial pre-forming of the novel fitting. It will be noted that the body portion 18 of the novel fitting has a heavier wall thickness than the ends 13 and 19 thereof. This places the most metal where the stresses are at a maximum and the fitting is strengthened at the radii thereof. The deformed filler material 6 shown in Fig. 3 may be removed by heat after the fitting is removed from the die 1.

The length, diameter, and wall thickness of the filler sleeve 6 and of the tubular blank 5, the size of the mandrel 7, and the diameter of the reduced ends 9 with relation to the diameter of the plungers 8 are all variable factors which must be taken into account in determining the size of fitting required, the wall thickness thereof, and any other factors, including the diameter and wall thickness of the counterbored ends. In carrying out this invention and to obtain high quality fittings, it is necessary that the volume of filler material and the volume of the mandrel enclosed between the ends of the blank, which will be determined by the diameter of the mandrel, be a definite ratio. Although the fitting has been described as one with counterbored ends, it will be evident that peripheral grooves may be formed a predetermined distance from the end of each branch of the fitting whereby the ends thereof are sized for conventional solder connections.

The reason for using a steel pin in the relation shown surrounded by filler is that this process holds the wall thickness of the completed T very uniform in that the flow of filler material is so directed by its flow in the restricted path between the mandrel and the blank that it pushes the blank material in the desired direction. One of the faults of other processes is that the resulting fittings formed thereby have a heavy build-up of the wall at the bottom opposite the branch and a reduction in wall thickness along the walls of the branch. The process disclosed herein makes it possible to hold a wall thickness along the walls of the branch equal to the wall thickness of the original blank and, at the same time, keeps the buildup at the bottom of the T opposite the branch to a minimum. In order to establish the ratio of the diameter of the blank and the mandrel which would produce satisfactory fittings without wrinkling or thickening of the blank, the limiting ratios were determined and the relative dimensions determined by relative weights of a solid filler and a hollow filler. The results indicated that the ratio of volume of pin enclosed in the filler material before it is compressed as defined supra to volume of filler must be held to a minimum of fifty percent and a maximum of sixty percent. Conversely, the filler must be held to a minimum of forty percent and a maximum of fifty percent in relation to the volume of pin.

Experiments show that any smaller pin allows the bottom wall of the finished T to become too heavy and the wall of the branch to thin out and often burst before the T is even formed because with such a small pin, the blank material is not properly pushed to the T. Also, from a practical production standpoint, any smaller pin cannot stand the pressures involved and will break. Conversely, any larger pin which would result in a ratio greater than sixty percent so reduces the volume of the filler that there is insufficient filler within the blank to produce a finished part. If a smaller pin is used, the filler material will do all the pushing on the blank material and a stretching of the blank at the top will result and the pin will bend and the bottom of the blank will thicken and the pin will be inclined to break. When small pins are used, even though they be resting on the bottom of the blank as has been done in previous designs of processes, the filler material is inclined to get under the pin and force it upward and break it. To avoid these disadvantages, the above limits of ratio of pins to filler obviate these problems. High quality fittings are produced which do not have to be machined to finish them.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows.

I claim:

A method of forming a T-fitting having a cylindrical body portion and a cylindrical leg comprising forming a tubular blank of predetermined length and cross section and made of tractable flowable material, inserting thereinto a cylindrical mandrel having thereon a hollow cylindrical sleeve made of plastic material and having an outside diameter substantially equal to the inside diameter of said tubular blank and the inside diameter substantially equal to the outside diameter of said mandrel, the ratio of the volume of said mandrel enclosed between the ends of said filler material before pressure is applied to said filler material by said plunger to the volume of the filler material being equal to between .5 and .6, confining said blank with said sleeve and said mandrel therein into a die having a main portion of a T-branch portion formed therein with an inner surface shaped to conform to the shape of said fitting to be formed, inserting into said die hollow plungers having reduced size ends engaging the ends of said filler material and peripheral shoulders spaced from the ends of said plungers engaging the ends of said blank, said plunger hollows receiving the ends of said mandrel, applying pressure to the ends of said plungers whereby said sleeve material urges said blank material toward said T-branch portion and a portion of said blank into said T-branch portion forming a branch, the volume of said branch formed being greater than the volume of filler material therein.

References Cited in the file of this patent

UNITED STATES PATENTS 2,603,175     Wurzburger _____ July 15, 1952